Oct. 12, 1948.  W. G. MITCHELL  2,451,234
COMPRESSION MEMBER
Filed Nov. 20, 1944
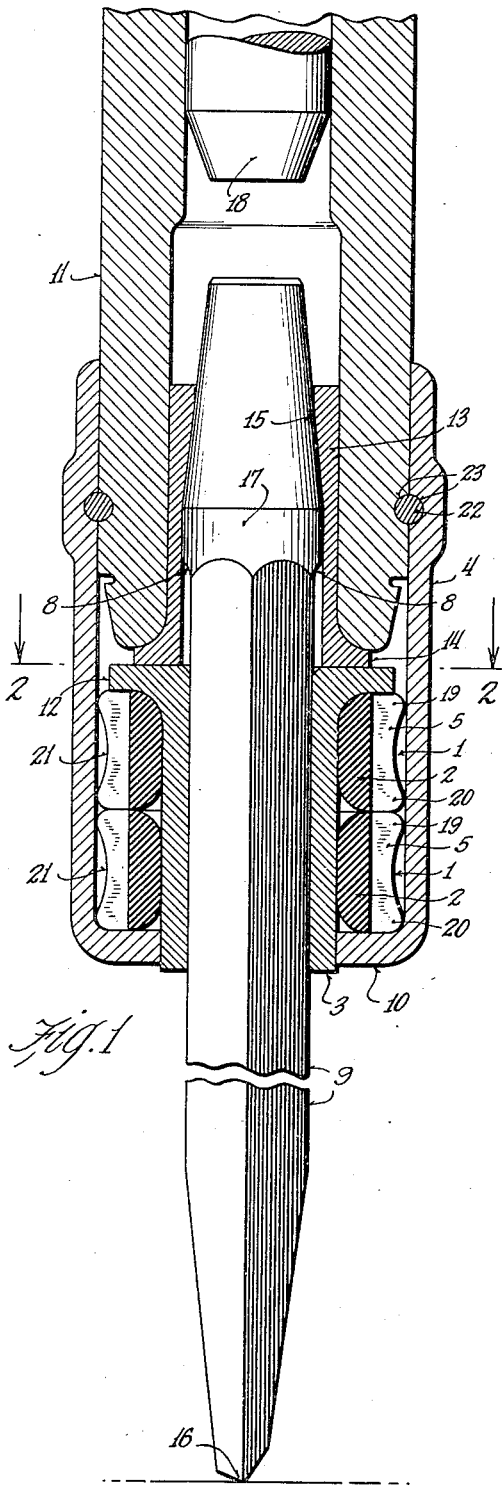
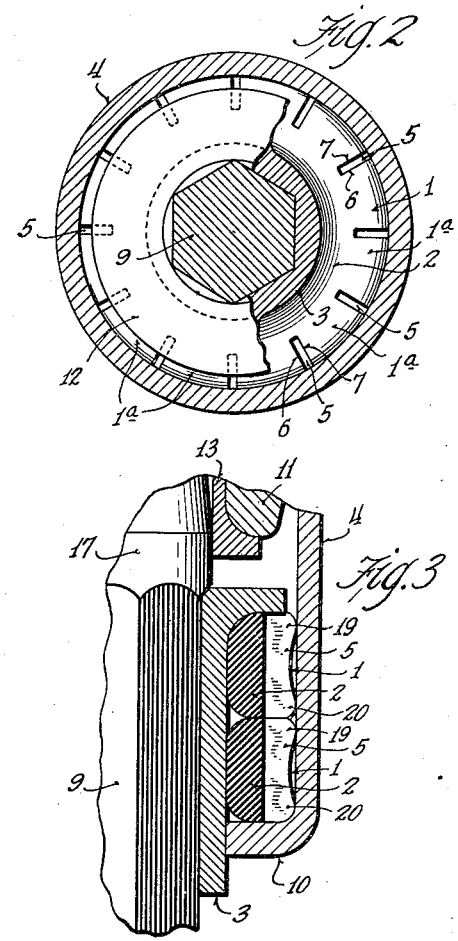
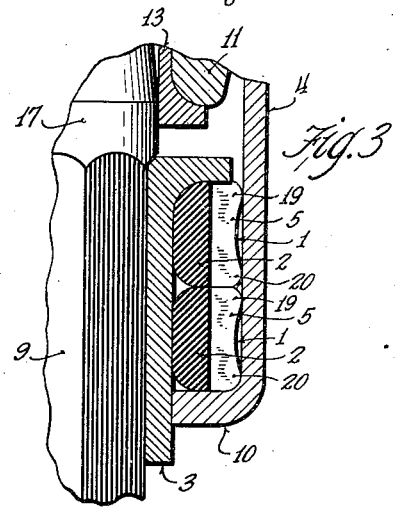
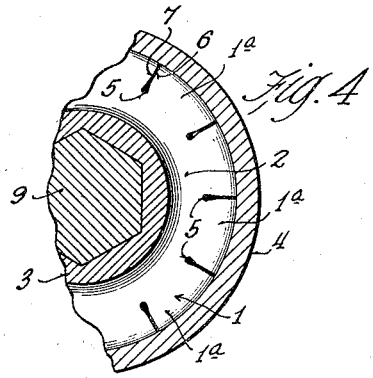
INVENTOR.
WALTER G. MITCHELL
BY
ATTORNEY.

Patented Oct. 12, 1948

2,451,234

UNITED STATES PATENT OFFICE 2,451,234

COMPRESSION MEMBER

Walter G. Mitchell, Aurora, Ill., assignor to Independent Pneumatic Tool Company, Chicago, Ill., a corporation of Delaware Application November 20, 1944, Serial No. 564,338

8 Claims. (Cl. 279—19.6)

This invention relates to improvements in compression members in general such as are comprised of resilient rubber or equivalent material for absorbing shocks or stresses in fabricated mechanisms.

The general object and purpose of my invention is to provide a resilient rubber or rubber-like compression member constructed with means which in response to the flexing of the member under the application and release of a load will create a flow of air over the member to carry off or dissipate the heat produced within the member from friction in flexing to maintain the member relatively cool and prolong the life and effectiveness thereof in use.

A further object of my invention is to make the compression member of a cellular like construction to provide openings or slots therein for the entry of air into the openings or slots in the outward flexing of the member to its normal or static state and to eject air from said openings or slots in the compression of the member when under load to create a flow of air to cool the member in the "breathing" of the same in flexing.

A further object of my invention is to arrange the openings or slots in the direction of the load applied on the member to compress it and opening through the outer surface of the member so that the intake and ejection of air will be caused by the change of section of the member in flexing.

A further object of my invention is to provide said openings or slots of a character permitting a change of section of the compression member as it is compressed and to increase the surface area of the member for the radiation of internal heat produced in the member in its flexing action.

In the specific embodiment of my invention as herein disclosed, it is an object of my invention to provide the openings in the body of the compression member in the form of slots extending partway into the body of the member from the outer periphery thereof and with the side walls of the slots opposed to provide for the intake of air as the side walls move apart and for the ejection of air as the side walls move towards each other in the flexing of the member in operation.

In particular, the compression members of my invention are applicable to chisel retainers for percussive tools in respect to which I have herein disclosed and claimed a specific embodiment of the invention.

While the specific compression member of my invention herein shown has a complement of openings or slots as herein described and claimed, it is within the contemplation of my invention to achieve similar results by providing a compression member with a grouping of properly spaced rubber or like columns to permit a change of section of the columns under compression and the ingress and egress of air between the columns to maintain the compression member relatively cool in flexing in performing its shock absorbing function.

In the accompanying drawing, illustrating a specific embodiment of my invention as first above indicated—

Fig. 1 shows the compression members of my invention employed in a chisel retainer of a percussive tool, the retainer and the adjacent portion of the tool barrel being shown in longitudinal section;

Fig. 2 is a cross-sectional view taken on line 2—2 of Fig. 1, the compression member being shown in its normal or non-compressed form;

Fig. 3 is a fragmentary longitudinal sectional view of the parts shown in Fig. 1, the compression members employed in the retainer construction being shown compressed by the mounting sleeve for the chisel; and Fig. 4 is a fragmentary view looking down on the compressed compression member to show the openings or slots therein in closed relation.

As shown in the drawings, the compression member 1 of my invention comprises a body portion 2 made of solid resilient rubber or rubber-like material of the size and shape required for the compression member to be used as a shock or jar absorber in a fabricated structure. For a chisel retainer of a pneumatic hammer or other percussive tool in respect of which the specific embodiment of my invention is shown in the drawings, the compression member 1 has annular form to fit about the mounting sleeve 3 of the retainer and be located in the space between the mounting sleeve 3 and the outer sleeve 4 of the retainer device.

The compression member 1 in accordance with my invention is provided with a plurality of slots 5, 5 extending part way into the body 2 of the compression member and disposed in the direction of the force applied to the compression member to compress it. When the compression member 1 is in annular form as herein shown, the slots 5 are disposed axially of the compression member to be in the direction of the compressive force and are radial of the member. In this form of construction, the slots 5 are spaced apart circumferentially about the outer periphery of the compression member 1 and open through the outer surface thereof as herein shown. As shown in Fig. 2, the slots 5 have an appreciable width to provide room for circumferential movement of the compression material, under a compressive force applied thereon. In response to the aforesaid circumferential movement, the opposed side walls 6, 7 of the slots move toward each other in somewhat the manner described by Poisson's ratio to eject air from the slots. On the release of the load on the compression, the side walls 6, 7 of the slots move away from each as the compression member expands in response to its inherent resiliency and the slots open for the re-entry of air.

In the rapid and repeated flexing of the compression member 1 as occurs when the shoulders 8 of the tool chisel 9 strike intermittently against the mounting sleeve 3 in the function of the retainer device, the slots 5 of the compression member 1 open and close with like speed as indicated in Figs. 2 and 4, respectively, and a flow of air is created for cooling the compression member.

The slots 5 thus provide cooling and space for expansion of the compressible material in a circumferential and radial direction reducing the internal work and heat within the resilient member 1 multiplying its life many times.

The slots 5 also increase the heat radiating surface with which the compression member is provided and in extending into the body 2 of the member enables the cooling air to reach well into the member to carry off the heat brought about in a rapid flexing action. In this respect, the slots 5 opening and closing in response to a flexing action of the compression member creates a "breathing effect" to maintain the same relatively cool.

In the retainer structure shown in the drawings, two compression members 1 are employed, fitting about the mounting sleeve 3 in superimposed relation, one resting on the other. The lower compression member 1 seats on an introverted flange 10 at the outer end of the outer sleeve 4 beyond the tool barrel 11 to which the outer sleeve is secured to attach the retainer device on the barrel. The upper compression member 1 fits against the under side of an overhanging flange 12 at the upper end of the mounting sleeve 3 as shown in Fig. 1.

The flange 10 supports the compression members 1 within the retainer device and the total mass of the two compression members 1, 1 is sufficient to normally hold the upper end of the mounting sleeve 3 against the bushing 13 which is fitted into the front or nose end of the tool barrel 11 for the chisel 9 as shown in Fig. 1. Said bushing 13 is provided with a stop flange 14 at its outer end to fit against the front end of the barrel 11 and the bushing 13 by an inwardly tapering portion 15 of its bore limits the extent to which the chisel may extend into the barrel when pressed against the work. Here, the chisel has a cutting edge 16 as in chisel design.

The chisel 9 below the shoulders 8 is formed to hexagonal shape in cross-section. And the bore of the mounting sleeve 3 is complementary in shape to fit about and guide the chisel as shown in Figs. 2 and 4. The flat faces of the chisel shank extend to the cylindrical portion 17 of the chisel within the bore of the bushing 13 and provide the chisel with six inset shoulders 8 to contact the upper end of the mounting sleeve 3 which is in the path of the shoulders to prevent the chisel dropping out of the barrel 11 or being shot therefrom by the reciprocable, compressed air operated, piston 18 which delivers the hammer or power blows on the chisel in a tool operation.

In response to the impacts of the shoulders 8 on the mounting sleeve 3 when the tool is operated with the chisel out of contact with the work or when the chisel glances from the work, the mounting sleeve is forced outwardly from the barrel 11 and the compression members 1 are compressed between the flange 12 on the mounting sleeve and the flange 10 on the outer sleeve 4 of the retainer device as shown in Fig. 3. The compression members 1 being made of resilient material, such as rubber or the like, absorb these impacts and relieve the outer sleeve 4 and the tool barrel of the same. In practice, these impacts are intermittent and rapid from a rapidly reciprocating piston 18 and the compression members absorb the same and in flexing create a flow of cooling air over the members, there being sufficient clearance between the sleeve 3 where it extends through an opening in the flange 10 for the ingress and egress of air with respect to the space between the two sleeves 3 and 4 and in which space the compression members 1 are located. Some air also escapes through the bushing 13.

As shown in Fig. 1, the body portion 2 of each compression member 1 has a radial dimension in its upper and lower areas 19, 20 to extend across the space between the two sleeves 3, 4. Between these areas 19, 20 the outer peripheral surface of the compression member 1 is concave as at 21 to provide additional room for the member to expand radially in response to the compression of the member.

The slotted or open construction of the compression member as herein shown and described gives it a cellular construction and enables rubber or equivalent resilient material to be employed for the compression or bumper members in chisel retainers and other installations requiring a similar action or result without the rubber material deteriorating from the internal heat produced in the bumper members in flexing. This results in these bumper members having a longer life and effectiveness than the previous constructions. The mass of the body material adjacent the slots 5, as for example the masses of the material between the slots form columns 1a, 1a, which change in section in the application of and release of a compressive force to create a flow of air into and out of the slots.

The outer sleeve 4 of the retainer device is releasably secured to the tool barrel 11 in any preferred manner. In the drawing, the connection is made by the use of a flexible cable-like element 22 fitting in registering grooves 23, 23 extending about the barrel 11 and the retainer sleeve 4, respectively.

The details of construction and arrangement of parts herein shown and described may be variously changed and modified without departing from the spirit and scope of my invention, except as pointed out in the annexed claims.

I claim as my invention:

1. The combination with the barrel of a percussive tool having a power operated hammering piston reciprocable therein, of a chisel with shoulders insertible into the barrel to receive the blows of the piston, a retainer device for the chisel having an outer sleeve secured to the barrel and an inner or mounting sleeve for the chisel in the path of said shoulders, bumper means in the form of a mass of resilient material supported by the outer sleeve about the mounting sleeve for absorbing the impact of the shoulders on the mounting sleeve when struck thereby, the outer surface of the bumper means being concave, and means extending continuously of the bumper means to substantially the full axial extent thereof and responsive to the expansion and compression of the bumper means in flexing from the impact of the shoulders on the mounting sleeve to create a flow of air over the bumper means to cool the same, said last named means opening outwardly through said outer concave surface.

2. The combination of the barrel of a percussive tool having a power operated hammering piston reciprocable therein, of a chisel with shoulders insertible into the barrel to receive the blows of the piston, a retainer device for the chisel having an outer sleeve secured to the barrel and an inner or mounting sleeve for the chisel in the path of said shoulders, and resilient bumper means supported by the outer sleeve about the mounting sleeve for absorbing the impact of the shoulders on the mounting sleeve when struck thereby, said bumper means having a concave outer surface and a plurality of openings extending through said concave surface for the entry and ejection of air in the expansion and compression of the bumper means in flexing from the impacts of the shoulders on the mounting sleeve to create a flow of air over the bumper means to cool the same, each opening extending continuously through the bumper means to substantially the full axial extent thereof.

3. The combination with the barrel of a percussive tool having a power operated hammering piston reciprocable therein, of a chisel with shoulders insertible into the barrel to receive the blows of the piston, a retainer device for the chisel having an outer sleeve secured to the barrel and an inner or mounting sleeve for the chisel in the path of said shoulders, and resilient bumper means supported by the outer sleeve about the mounting sleeve for absorbing the impact of the shoulders on the mounting sleeve when struck thereby, said bumper means having a concave outer surface and a plurality of peripherial slots extending through said concave surface for the entry and ejection of air in response to the expansion and compression of the bumper means in flexing from the impacts of the shoulders on the mounting sleeve to create a flow of air over the bumper means to cool the same, each slot extending continuously through the bumper means to substantially the full axial extent thereof.

4. The combination with the barrel of a percussive tool having a power operated hammering piston reciprocable therein, of a chisel with shoulders insertible into the barrel to receive the blows of the piston, a retainer device for the chisel having an outer sleeve secured to the barrel and an inner or mounting sleeve for the chisel in the path of said shoulders, and rubber or rubber-like bumper means supported by the outer sleeve about the mounting sleeve for absorbing the impacts of the shoulders on the mounting sleeve when struck thereby, said bumper means having substantially flat top and bottom surfaces and a concave outer surface therebetween, said bumper means having slots therein opening through said top, bottom and concave surfaces for the entry and ejection of air to create a flow of air over the bumper means to cool the same in the expansion and compression of the bumper means in flexing.

5. The combination with the barrel of a percussive tool having a power operated hammering piston reciprocable therein, of a chisel with shoulders insertible into the barrel to receive the blows of the piston, a retainer device for the chisel having an outer sleeve secured to the barrel and an inner or mounting sleeve for the chisel in the path of said shoulders, and resilient bumper means supported by the outer sleeve about the mounting sleeve for absorbing the impacts of the shoulders on the mounting sleeve when struck thereby, said bumper means having a concave outer surface and a plurality of radial axially disposed, circumferentially spaced slots about the bumper means and extending through the said outer concave surface, each slot extending axially of the bumper means to substantially the full extent thereof and having the lateral and substantially flat side walls of the slots moving towards and from each other in the expansion and compression of the bumper means from the impacts of the shoulders on the mounting sleeve to create a flow of air over the bumper means to cool the same.

6. A compression member of the character described comprising, a body member made of a mass of resilient material and having an outer concave surface and a plurality of slots therein, said slots opening through the outer concave surface of the body member for the entry and ejection of air in the flexing of the body member to cool the same, the slots being disposed in the direction in which the body member is compressed, and each slot extending axially of the compression member to substantially the full extent thereof.

7. A compression member of the character described comprising, a body member in annular form or substantially so and having a plurality of slots therein about the outer periphery of the compression member and opening through the outer surface thereof, and said slots being disposed in circumferentially spaced relation about the compression member and extending axially thereof, said compression member having its outer peripherial surface formed with a concave formation for radial clearance on compression of the member.

8. The combination with two relatively movable elements adapted to move towards and from one another, of a compression member therebetween and adapted to absorb the shock between the elements when moved relatively towards each other, said compression member being comprised of a body of resilient or rubber-like material and having an outer concave surface and a plurality of slots in said surface having substantially flat side walls for the entry and ejection of air in the flexing of the compression member to cool the same in the movement of said side walls toward and from each other, and said slots extending through the concave outer surface of the compression member in the direction in which the compression member is compressed between said elements, and each slot extending through the compression member to the full extent thereof in the direction in which the force is applied.

WALTER G. MITCHELL.

REFERENCES CITED

The following references are of record in the file of this patent:

UNITED STATES PATENTS

| Number | Name | Date |
| --- | --- | --- |
| 1,882,520 | Pollard | Oct. 11, 1932 |
| 1,959,256 | Zerk | May 15, 1934 |

FOREIGN PATENTS

| Number | Country | Date |
| --- | --- | --- |
| 211,989 | Switzerland | 1941 |
| 213,019 | Great Britain | 1924 |